United States Patent Office 3,172,876
Patented Mar. 9, 1965

3,172,876
PROCESS FOR THE MANUFACTURE OF
MODIFIED POLYVINYL ALCOHOLS
Gerold Koch and Johann Wolfgang Zimmermann, both of Frankfurt am Main, and Fritz Winkler, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Dec. 20, 1960, Ser. No. 77,020
Claims priority, application Germany, Dec. 23, 1959,
F 30,164/59
17 Claims. (Cl. 260—85.7)

The present invention relates to a process for the manufacture of modified polyvinyl alcohols.

The processes known for making polyvinyl alcohols basically use two methods. (1) Saponification or ester interchange of copolymers of vinyl esters and difficultly saponifiable or unsaponifiable monomers, the copolymers containing at least 50 mol percent of vinyl ester structures, which are completely or substantially saponified to vinyl alcohol structures. These copolymers include more especially those of vinyl acetate/ethylene, vinyl formate/vinyl stearate, vinyl acetate/vinyl octadecylethers, vinyl acetate/crotonic acid. (2) Subsequent reaction of a part of the hydroxyl groups of polyvinyl alcohol. Such subsequent reaction includes esterifications, acetalizations, cyano-ethylation and also associate-formation with boric acid or phosphoric acid or with dyestuffs of the Congo-red series.

The above two basic processes permit the manufacture of modified polyvinyl alcohols having the most various properties as regards, for example, the action of protective colloids, reduction of surface tension of solutions, adhesiveness on different supports, viscosity etc.

From an industrial point of view, it is preferred to use method (1) as the reaction of highly polymeric substances by method (2) always involves more or less great difficulty in processing.

The present invention is concerned with the transformation of vinyl ester structures of a vinyl ester copolymer into vinyl alcohol structures:

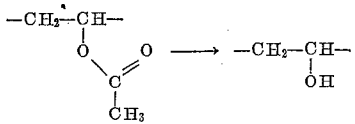

This reaction is formally considered as saponification. In practice, this reaction is usually carried out as ester interchange or alcoholysis:

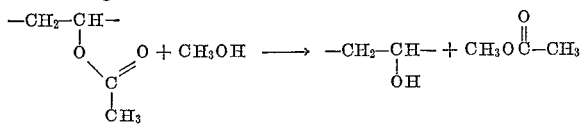

For the purpose of this invention, the above reaction is always termed alcoholysis.

The present invention provides a process for making novel phosphorus-modified polyvinyl alcohols having valuable technological properties, wherein a copolymer obtained in known manner from a vinyl ester of a saturated carboxylic acid and an olefinically unsaturated phosphonic acid dialkyl ester is alcoholyzed while dissolved in methanol or a mixture of methanol and methyl acetate in the presence of 0 to 15% by weight water, calculated on the copolymer, until a product, in which at least 80% of the initial vinyl ester groups are transformed into vinyl alcohol groups, is obtained.

The process of this invention advantageously uses copolymers in which the vinyl ester structures are vinyl esters of a saturated monocarboxylic acid containing 1 to 18 carbon atoms. As appropriate vinyl esters there may be mentioned more especially: vinyl formate, vinyl propionate, vinyl butyrate, vinyl stearate and advantageously vinyl acetate. The copolymers to be alcoholized according to this invention may also contain 2 or more of the aforesaid vinyl esters as structural elements, if desired in combination with other copolymerizable monomers, such as vinyl chloride, ethylene, isobutylene, esters of saturated, monohydric, aliphatic alcohols containing 1 to 4 carbon atoms and acrylic acid, methacrylic acid, maleic acid or fumaric acid.

As unsaturated phosphonic acid esters which may be used for making the above copolymers, there may be mentioned, for example: diesters of ethene, propene or allylphosphonic acid and monohydric, saturated alcohols containing 1 to 18 carbon atoms, advantageously 1 to 12 carbon atoms, in a straight or branched chain.

The copolymers to be alcoholized advantageously should contain 0.1 to 20% by weight phosphonic acid ester structures.

Before alcoholysis, the copolymer is dissolved in methanol or a mixture of methanol and methyl acetate in a ratio by weight of 99:1 to 70:30. The resulting solution should contain dissolved copolymer in a concentration of generally 10–60% by weight, and advantageously 20–50% by weight, calculated on the total solution.

As alcoholysis-catalysts there may be used compounds of either alkaline or acid reaction. They are used in a proportion of 0.3 to 20% by weight, calculated on the copolymer.

Compounds of alkaline reaction are more especially alkali metal hydroxides, advantageously sodium hydroxide, alkali metal alcoholates of alcohols containing 1 to 4 carbon atoms. These compounds are preferably used in a proportion of 0.3 to 4.0% by weight, calculated on the copolymer.

As compounds of acid reaction, which are preferably used in a proportion of 1.6 to 20% by weight, calculated on the copolymer, there may be mentioned, for example: strong mineral acids, such as hydrochloric acid, perchloric acid or preferably sulfuric acid; there may also be used organic acids, such as trichloroacetic acid or dodecylbenzene-sulfonic acid.

The addition of water in a proportion of up to 15% by weight, calculated on the copolymer, to the starting material to undergo alcoholysis has an unexpectedly favorable influence on the solubility properties of the resulting modified polyvinyl alcohol as will be demonstrated below.

The following statements are intended to illustrate the relationship between phosphorus content of the copolymer and the properties of the modified polyvinyl alcohol obtained from said copolymer by alcoholysis in an anhydrous medium.

When copolymers of vinyl acetate and increasing amounts of ethenephosphonic acid diethyl ester are subjected in anhydrous methanol in the presence of 1.7% by weight of sodium hydroxide, calculated on the copolymer, to alcoholysis at 20° C., it is unexpectedly found that the viscosity of an aqueous solution of the modified polyvinyl alcohol obtained increases considerably, and the polyvinyl alcohols finally obtained are only swellable in water or water-insoluble as demonstrated by the following table.

| Percent by weight ethene phosphonic acid-diethylester in copolymer | K-value of copolymer | K-value of corresponding polyvinyl alcohol, 1% in aqueous solution | Percent by weight residual acetyl |
|---|---|---|---|
| 4.50 | 53 | Water-insoluble | 1-2 |
| 2.20 | 53 | do | 1-2 |
| 1.53 | 53 | Water-swellable | 1-2 |
| 1.15 | 53 | do | 1-2 |
| 1.00 | 53 | About 105 | 1-2 |
| 0.92 | 53 | 92 | 1-2 |
| 0.77 | 53 | 74 | 1-2 |
| 0.50 | 53 | 61 | 1-2 |
| 0.00 [1] | 53 | 48 | 1-2 |

[1] Vinyl acetate homopolymer (comparative test).

The above table demonstrates that water-insoluble or only water-swellable products are obtained when the copolymer used as starting material contains more than 1.00% by weight of ethenephosphonic acid diethyl ester. The products, moreover, do not dissolve either in dilute alkali metal hydroxide or in dilute aqueous acids.

The above table shows that during alcoholysis of the copolymer in an anhydrous medium the K-value of modified polyvinyl alcohols and hence the viscosity of their aqueous solutions can be considerably increased irreversibly in simple manner by increasing the proportion of phosphonic acid ester structures in the copolymer used as starting material. The water-swellable or water-insoluble polyvinyl alcohols obtained by the process of this invention differ substantially from those which are modified with sulfonic acids or crotonic acids. They differ substantially, for example, from modified polyvinyl alcohols obtained from carboxylic acid structures and vinyl alcohol structures in view of the fact that the latter polyvinyl alcohols, even if water-insoluble, dissolve in water upon adding ammonia or alkalies, while the water-swellable or water-insoluble polyvinyl alcohols according to this invention do not.

In view of the importance phosphorus-containing products have gained in many fields of application, for example as detergents, anticorrosion agents or flame-proofing agents, it appeared also desirable to prepare water-soluble polyvinyl alcohols containing a greater proportion of incorporated phosphonic acid esters. Products which are only swellable are difficult to handle since, for example, they cannot be purified by filtration and can hardly be used in chemical reactions.

It is therefore a further object of this invention to produce water-soluble alcoholysis products from copolymers containing a relatively great proportion of incorporated phosphonic acid esters. These products were unexpectedly obtained by carrying out alcoholysis in the presence of a small proportion of water, i.e. up to 15%, calculated on the weight of the copolymer.

Water may be added to the mixture to undergo alcoholysis before, i.e. separately from, or simultaneously with the catalyst. In alkaline alcoholysis, it is generally sufficient to add 1-7% by weight water or advantageously 3-7% by weight water. In acid alcoholysis, it is generally advantageous to use an amount greater than indicated above, i.e. about 5-15% by weight, calculated on the copolymer. In order to obtain satisfactory water-soluble products, the amount of water added—within the limits specified above—should be the greater the higher the content of incorporated phosphonic acid esters in the copolymer and the smaller the concentration of the copolymer solution.

The alcoholysis according to this invention is generally carried out at 15-90° C. while the copolymer solution is vigorously stirred. Alcoholysis in the presence of an alkaline catalyst is preferably conducted at 15-30° C. and alcoholysis in the presence of an acid catalyst at 30-90° C.

During alcoholysis, the viscosity of the copolymer solution is increased until modified polyvinyl alcohol is finally obtained as a white powder. The powder is filtered off, if desired washed with methanol or methyl acetate, dried at 60° C. under a pressure of 30 mm. of mercury, or in another usual manner.

Alcoholysis is carried out for a period of 1-24 hours. Alkali-catalyzed alcoholysis is conducted for a period of 1-8 hours and acid-catalyzed alcoholysis for a period of 4-24 hours.

In the alcoholysis according to this invention, about 80-100% of the vinyl ester structures contained in the copolymer, preferably vinyl acetate structures, are transformed into vinyl alcohol structures, that is to say the vinyl structures are subjected to complete or partial alcoholysis.

The desired degree of alcoholysis can be obtained as follows:

(A) Reducing the amount of alcoholysis catalyst, especially when an alkaline catalyst is used, for example to 0.3-1% by weight, calculated on the copolymer.

(B) Interrupting the alcoholysis reaction at a moment which is determined by a preliminary test and at which the desired degree of alcoholysis is obtained. Interruption may be brought about, for example, by neutralizing the catalyst, for example, by adding acetic acid when an alkaline catalyst is used.

The process of this invention, especially when carried out in the presence of water, does not exclude, of course, that phosphonic acid ester structures are transformed into phosphonic acid structures, but these statements should not be understood as limiting the invention.

The process of this invention leads to a novel series of modified polyvinyl alcohols which, due to the bound phosphorus they contain, differ considerably from known polyvinyl alcohols as regards their behavior in water. More especially, it could not be expected that water-soluble, modified polyvinyl alcohols can also be obtained according to a special variant of the present process from copolymers containing a relatively great proportion of phosphonic acid ester structures. This was the more surprising as the usual alkaline process in an anhydrous medium unexpectedly leads to water-insoluble products when the starting copolymer contains little phosphonic acid ester, for example vinylphosphonic acid diethyl ester in a proportion of more than 1% by weight.

The process of this invention permits transforming one and the same starting copolymer, depending on the type of alcoholysis used, into products of very different solubility. Moreover, it offers a series of possibilities to produce novel modified polyvinyl alcohols by varying the phosphonic acid diesters contained in the starting copolymer, for example ethene, propene or allyl phosphonic acid diesters. The products obtained by the process of the invention can therefore be widely used, more especially in the following fields of application:

Highly viscous types, which are obtained, for example, by alkaline alcoholysis or ester-interchange without water being added, are especially suitable for use as thickening agents or protective colloids.

Other types of modified polyvinyl alcohols which are prepared in the same manner but contain a slightly greater proportion of phosphorus and are only water-swellable, can advantageously be used as nutrient media for bacteriae and mold fungi.

The water-soluble types are especially used as textile auxiliary agents, protective colloids, emulsifiers, adhesives, anti-corrosion agents and in the medicine sector.

The following table is intended to demonstrate the relationship between phosphorus content of starting copolymer, nature of alcoholysis, solubility properties and analytical data of the alcoholysis products obtained by this invention by alcoholysis of a copolymer consisting of vinyl acetate and ethene phosphonic acid diethylester.

| Percent by weight ethene phosphonic acid diethylester in copolymer | Alcoholysis | Solubility of modified polyvinyl alcohol in water | Phosphorus | Analysis of product, percent by weight, rest acetyl | Hydroxyl |
|---|---|---|---|---|---|
| 0.3–1.0 | Alkaline catalyst without water | Highly piscous, soluble | 0.06–0.5 | 0.1–17.0 | 20.0–40.5 |
| 0.3–1.0 | Acid catalyst without water | ......do...... | 0.06–0.5 | 0.1–17.0 | 20.0–40.5 |
| 1.1–2.0 | Alkaline catalyst without water | Swellable | 0.5–1.1 | 0.1–17.0 | 19.0–40.0 |
| 1.1–2.0 | Acid catalyst without water | ......do...... | 0.5–1.1 | 0.1–17.0 | 19.0–40.0 |
| 2.1–10.0 | Alkaline catalyst without water | Insoluble | 1.1–5.0 | 0.1–16.0 | 16.0–39.0 |
| 2.1–10.0 | Acid catalyst without water | ......do...... | 1.1–5.0 | 0.1–16.0 | 16.0–39.0 |
| 0.3–10.0 | Alkaline catalyst with water | Soluble | 0.06–5.0 | 0.1–17.0 | 16.0–40.5 |
| 0.3–10.0 | Acid catalyst with water | ......do...... | 0.06–5.0 | 0.1–17.0 | 16.0–40.5 |

The following examples serve to illustrate the invention but they are not intended to limit it thereto, the parts being by weight unless otherwise stated:

*Example 1*

In a 10-liter three-necked flask provided with a stirrer, thermometer and reflux condenser, a solution of 914 parts of a copolymer having a K-value of 53 and consisting of 985 parts vinyl acetate and 7.65 parts of ethene-phosphonic acid-diethylester in 3,656 parts anhydrous methanol was mixed at 20° C. while stirring with 109.5 parts of a 15% solution of sodium hydroxide in methanol.

After about 12 minutes, modified polyvinyl alcohol commenced to precipitate in the methanol/methyl acetate mixture which had formed. The whole was then stirred for a further 4 hours.

The polyvinyl alcohol powder obtained was suction-filtered, washed with methanol and dried in a vacuum drying cabinet at 40° C. under a pressure of 30 mm. of mercury.

A fine-grained, white powder which had a K-value of 74 and was water-soluble was obtained.

Analytical data:

|  | Percent |
|---|---|
| Content of phosphorus | 0.3 |
| Content of rest acetyl | 0.8 |
| Content of hydroxyl | 38.7 |

*Example 2*

914 parts of a copolymer having a K-value of 53 and consisting of 985 parts vinyl acetate and 15.3 parts ethene-phosphonic acid diethylester were alcoholyzed in anhydrous methanol by the process described in Example 1.

The resulting fine-grained, white and modified polyvinyl alcohol was only swellable in water.

Analytical data:

|  | Percent |
|---|---|
| Content of phosphorus | 0.7 |
| Content of rest acetyl | 1.0 |
| Content of hydroxyl | 37.7 |

*Example 3*

914 parts of a copolymer having a K-value of 53 and consisting of 955 parts vinyl acetate and 46 parts ethene-phosphonic acid diethylester were alcoholyzed in anhydrous methanol in the manner described in Example 1.

The resulting, fine-grained, white and modified polyvinyl alcohol was insoluble in water.

Analytical data:

|  | Percent |
|---|---|
| Content of phosphorus | 2.5 |
| Content of rest acetyl | 1.0 |
| Content of hydroxyl | 36.8 |

*Example 4*

In the flask described in Example 1, a solution of 1000 parts of a copolymer of vinyl acetate and ethene-phosphonic acid diethylester (ratio by weight: 95.5:4.5; K-value:70) in 3900 parts methanol and 115 parts water was mixed, while stirring, with 60 parts concentrated sulfuric acid, and the whole was heated for 12 hours under reflux by means of a water bath. The resulting fine-powdered, modified polyvinyl alcohol was suction-filtered, washed with methyl acetate and dried in a vacuum drying cabinet at 20–25° C. under a pressure of 30 mm. of mercury. A slightly yellowish powder which yielded a clear solution in water was obtained. The product contained 1.4% rest acetyl, 2.4% phosphorus and had a K-value of 67.

*Example 5*

In a 1-liter three-necked flask provided with stirrer, thermometer and reflux condenser, 500 parts of a 20% by weight solution of a copolymer of vinyl acetate and ethene-phosphonic acid-diethylester (95.5:4.5 parts by weight; K-value:70) in methanol were mixed, while stirring, with 6.4 parts concentrated sulfuric acid diluted with 1.6 parts water, and the whole was heated for 12 hours under reflux. Modified polyvinyl alcohol was obtained which was washed with methanol and dried in a vacuum drying cabinet at 20° C. under a pressure of 30 mm. of mercury. The polyvinyl alcohol so obtained was only swellable or gave a turbid solution in water at pH 7. After the addition of sodium hydroxide solution to change the pH to 8, a clear solution was obtained.

The product contained 1.3% rest acetyl, 2.3% phosphorus and had a K-value of 69.

*Example 6*

In a 6-liter, three-necked round flask provided with stirrer and thermometer, 2500 parts of a 20% by weight solution of a copolymer of vinyl acetate and ethene-phosphonic acid diethylester (97.7:2.3 parts by weight; K-value:54) in methanol was mixed, while stirring, with 25 parts water. After 15 minutes, 17 parts of a 15% by weight methanolic sodium hydroxide solution were added and the whole was stirred for 4–5 hours a 20–25° C. with the exclusion of air. 2000 parts methyl acetate were added, the modified polyvinyl alcohol was removed by suction-filtration, after-washed with methanol, and dried in a vacuum drying cabinet at 20–25° C. under a pressure of 30 mm. of mercury.

The modified polyvinyl alcohol contained 11% rest acetyl, 0.9% phosphorus, was water-soluble, and had a K-value of 72.

*Example 7*

3000 parts methanol, 40 parts water and 20 parts of a 15% by weight methanolic sodium hydroxide solution were introduced into a steel pot with a three-tubulated cover which could be clamped to the pot in air-tight manner and was provided with an anchor stirrer, thermometer, reflux condenser. 600 parts of the copolymer specified in Example 6 were then added within 45 minutes at a stirrer speed of 150 revolutions per minute, and the whole was stirred for a further 3 hours at 20–25° C. A further 48 parts of the above 15% by weight methanolic sodium hydroxide solution were added dropwise within 15 minutes, stirring was continued for a further 2 hours at 20–25° C., and the whole mixture was boiled for 1 hour under reflux. The resulting modified polyvinyl alcohol was cooled, suction-filtered, washed with methanol, and dried in a vacuum-drying cabinet at 20–25° C. under a pressure of 30 mm. of mercury. The product so prepared contained 1.5% rest acetyl and 1.1% phosphorus. The polyvinyl alcohol so obtained swelled in pure water at pH 7 to give some kind of a gel and dissolved after addition of a little 2 N-sodium hydroxide solution until the pH was 8. The product had a K-value of 80, determined with a solution prepared from 100 cc. of a 1% aqueous gel of the product which was dissolved by adding 1 cc. 0.5 N-sodium hydroxide solution.

*Example 8*

50 parts of a copolymer having a K-value of 44 and consisting of vinyl acetate and 2-propene-phosphonic acid diethyl ester (90:10 parts by weight) were dissolved, while stirring, in 160 parts methanol and 70 parts methyl acetate. 4.8 parts concentrated sulfuric acid diluted with 3.2 parts water were then added and the whole was heated for 24 hours under reflux. A slightly cream colored, modified polyvinyl alcohol was obtained. It was washed with methanol on the suction filter until neutral.

The alcohol so obtained was dried at 50° C. under a pressure of 30 mm. of mercury. It was soluble in water and had a K-value of 58. The product contained 2.9% phosphorous and 2.1% rest acetyl.

*Example 9*

50 parts of a copolymer having a K-value of 48 and consisting of vinyl acetate and allylphosphonic acid diethyl ester (95:5 parts by weight) were dissolved in 160 parts methanol. 8 parts of a 15% by weight methanolic sodium hydroxide solution diluted with 2 parts water were then added slowly while stirring. Alcoholysis was complete after 6 hours at 20–25° C. The resulting polyvinyl alcohol was washed on the suction filter with much methanol until neutral and dried in a vacuum drying cabinet at 50° C. under a pressure of 30 mm. of mercury.

The product was water-soluble and had a K-value of 56. A 1% solution of the product in water had a surface tension of 60 dyn./cm. The product contained 1.5% phosphorus and 2.6% rest acetyl.

*Example 10*

70 parts of a copolymer of vinyl acetate and vinylphosphonic acid dibutylester (80:20 parts by weight) were dissolved in 230 parts methanol. 3 parts water and 30 parts of a 5% methanolic sodium hydroxide solution were then added slowly while stirring at 20–25° C. After 6 hours, alcoholysis was interrupted by adding 15 parts of a 20% by weight solution of acetic acid in water. The fine-powdered, modified polyvinyl alcohol which had precipitated was washed with methanol until neutral and dried in a vacuum drying cabinet at 50° C. under a pressure of 30 mm. of mercury.

The product was water-soluble after addition of a little 2 N-sodium hydroxide solution to water. The product contained 5.5% phosphorus and 5.6% rest acetyl.

*Example 11*

100 parts of a copolymer having a K-value of 47 and consisting of vinyl acetate and vinyl phosphonic acid dimethylester (90:10 parts by weight) were dissolved in 165 parts methanol and 75 parts methyl acetate. 4.5 parts concentrated sulfuric acid which had previously been diluted with 7.5 parts methanol and 3 parts water, were then added while stirring. The whole was heated until reflux set in and stirred at that temperature for 24 hours. The resulting modified polyvinyl alcohol was washed with methanol until neutral and dried in a vacuum drying cabinet at 50° C. under a pressure of 30 mm. of mercury. 43 grams of a fine white powder which was readily soluble in dilute sodium hydroxide solution were obtained.

The product contained 4.3% phosphorus, 2.0% rest acetyl and had a K-value of 55.

We claim:
1. A process for the manufacture of a modified polyvinyl alcohol which comprises subjecting a copolymer of components consisting essentially of (1) a vinyl ester of a saturated carboxylic acid containing 1 to 18 carbon atoms and (2) from 0.1 to 20 percent by weight, based on total monomers, of an alkenyl phosphonic acid dialkyl ester, the alkenyl groups of which contain 2 to 3 carbon atoms and the alkyl groups of which contain 1 to 18 carbon atoms, to alcoholysis in the presence of an alcoholysis catalyst, at a temperature within the range of about 15 to 90° C., with methanol in the presence of 0 to 15 percent water, calculated on the weight of the copolymer, while dissolved in said methanol until a product is obtained in which at least 80 percent of the ester groups of said component (1) are alcoholized into vinyl alcohol groups.
2. The process of claim 1, wherein the vinyl ester is vinyl formate.
3. The process of claim 1, wherein the vinyl ester is vinyl propionate.
4. The process of claim 1, wherein the vinyl ester is vinyl butyrate.
5. The process of claim 1, wherein the vinyl ester is vinyl stearate.
6. The process of claim 1, wherein the vinyl ester is vinyl acetate.
7. The process of claim 1, wherein the phosphonic acid dialkyl ester is a dialkyl ester of vinyl phosphonic acid.
8. The process of claim 1, wherein the phosphonic acid dialkyl ester is a dialkyl ester of propene phosphonic acid.
9. The process of claim 1, wherein the phosphonic acid dialkyl ester is a dialkyl ester of allyl phosphonic acid.
10. The process of claim 1, wherein the alcoholysis is carried out in a solvent consisting essentially of methanol and methyl acetate.
11. The process of claim 1, wherein the catalyst is an alkali metal hydroxide.
12. The process of claim 1, wherein the catalyst is a strong acid.
13. A copolymer prepared by the process as defined in claim 1.
14. A copolymer prepared by the process as defined in claim 1 wherein component (1) is vinyl acetate and component (2) is vinyl phosphonic acid diethyl ester.
15. A copolymer prepared by the process as defined in claim 1 wherein component (1) is vinyl acetate and component (2) is vinyl phosphonic acid dibutyl ester.
16. A copolymer prepared by the process as defined in claim 1 wherein component (1) is vinyl acetate and component (2) is vinyl phosphonic acid dimethyl ester.
17. A copolymer prepared by the process as defined in claim 1 wherein component (1) is vinyl acetate and component (2) is propenyl phosphonic acid diethyl ester.

References Cited in the file of this patent

UNITED STATES PATENTS

| | | |
|---|---|---|
| 2,227,997 | Berg | Jan. 7, 1941 |
| 2,399,653 | Roland | May 7, 1946 |
| 2,439,214 | Lindsey | Apr. 6, 1948 |
| 2,636,027 | Coover et al. | Apr. 21, 1953 |
| 2,691,567 | Kvalnes et al. | Oct. 12, 1954 |
| 2,733,229 | Brace | Jan. 31, 1956 |
| 2,827,475 | Coover | Mar. 18, 1958 |
| 2,940,961 | Coover | June 14, 1960 |
| 2,971,948 | Messwarb | Feb. 14, 1961 |

OTHER REFERENCES

Conant and Blatt: The Chemistry of Organic Compounds, 5th Ed., MacMillan Company, 1959, New York, N.Y., page 135.

Noller: Chemistry of Organic Compounds, 2nd Edition, W. B. Saunders and Company, Philadelphia, Pennsylvania, 1957, pages 170 and 171.